(12) United States Patent
Otosaka

(10) Patent No.: US 11,034,608 B2
(45) Date of Patent: Jun. 15, 2021

(54) METHOD OF FORMING CONICAL SHAPE ON GLASS ROD, AND GLASS ROD

(71) Applicant: SHIN-ETSU CHEMICAL CO., LTD., Tokyo (JP)

(72) Inventor: Tetsuya Otosaka, Gunma (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1076 days.

(21) Appl. No.: 14/960,938

(22) Filed: Dec. 7, 2015

(65) Prior Publication Data

US 2016/0185646 A1 Jun. 30, 2016

(30) Foreign Application Priority Data

Dec. 26, 2014 (JP) .............................. JP2014-266585

(51) Int. Cl.
*C03B 37/012* (2006.01)

(52) U.S. Cl.
CPC .... *C03B 37/01251* (2013.01); *C03B 2205/47* (2013.01)

(58) Field of Classification Search
CPC ....................... C03B 37/01251; C03B 2205/47
See application file for complete search history.

(56) References Cited

U.S. PATENT DOCUMENTS

| | | | |
|---|---|---|---|
| 6,134,922 A | 10/2000 | Shimada et al. | |
| 6,386,001 B1 * | 5/2002 | Shimizu | C03B 23/047 65/377 |
| 6,649,261 B2 * | 11/2003 | Jensen | C03B 37/01205 385/124 |
| 2001/0023598 A1 * | 9/2001 | Kohmura | C03B 37/01251 65/377 |
| 2007/0125128 A1 * | 6/2007 | Shah | C03B 37/01251 65/414 |
| 2007/0245773 A1 * | 10/2007 | Peekhaus | C03B 37/01205 65/393 |
| 2012/0055198 A1 | 3/2012 | Otosaka | |

FOREIGN PATENT DOCUMENTS

| | | | |
|---|---|---|---|
| CN | 102627399 | 8/2012 | |
| JP | H5-24877 | 2/1993 | |
| JP | 2006-111461 | * 4/2006 | ........... C03B 37/027 |
| JP | 2007-246327 | 9/2007 | |

(Continued)

OTHER PUBLICATIONS

Machine Translation of JP 2006-111461. May 11, 2018 pp. 1-10.*

(Continued)

*Primary Examiner* — John M Hoffmann
(74) *Attorney, Agent, or Firm* — Greenblum & Bernstein, P.L.C.

(57) ABSTRACT

In a method of forming a conical shape on a glass rod including an effective portion and an ineffective portion adjoining the effective portion to form a conical shape in the effective portion by simultaneously heating a boundary and the vicinity of the boundary between the effective portion and the ineffective portion and pulling an end of the ineffective portion, the temperature of a heater is raised and a heating target on the glass rod is simultaneously moved from the ineffective portion to the boundary.

4 Claims, 4 Drawing Sheets

(56) References Cited

FOREIGN PATENT DOCUMENTS

| JP | 4333335 | 9/2009 |
|----|---------|--------|
| JP | 2012-76989 | 4/2012 |

OTHER PUBLICATIONS

Official Action, along with English-language translation thereof, issued in JP App. No. 2014-266585 dated Sep. 26, 2017.
Chinese Office Action, Chinese Patent Office, Application No. 201510997904.0, dated May 27, 2020, with English translation.
India Pre-grant Opposition, India Patent Office, Application No. 4151/DEL/2015, dated Feb. 3, 2020.

* cited by examiner

Room Temperature  1500°C  2000°C

2250°C  2250°C

Room Temparature

2250°C

2250°C

METHOD OF FORMING CONICAL SHAPE ON GLASS ROD, AND GLASS ROD

CROSS-REFERENCE TO RELATED APPLICATION

This non-provisional application claims priority under 35 U.S.C. § 119(a) from Japanese Patent Application No 2014-266585, filed on Dec. 26, 2014, the entire contents of which are incorporated herein by reference.

BACKGROUND

1. Technical Field

The present invention relates to a method of forming a conical shape on a glass rod by pulling an end of a heated glass rod, such as an optical fiber base material, and to a glass rod.

2. Background Art

An optical fiber base material made of quartz glass is produced by, for example, MCVD method, PCVD method, VAD method, OVD method, or the rod-in-tube method. In any of these methods, a portion that cannot be used as an optical fiber (hereinafter referred to as "ineffective portion") exists on an end of the base material. Such portion is removed by thermal cutting before a drawing process. Meanwhile the portion that can be used as an optical fiber (hereinafter referred to as "effective portion") is adjusted to have a conical shape as illustrated in FIG. 2 so that the drawing process can be conducted smoothly.

The process of treating an end portion of the base material is called "conical shape forming" or "drawing end forming" process. An automatic drawing end forming apparatus related to the process is disclosed in Japanese Patent Application Laid-Open No. 5-24877. The automatic drawing end forming apparatus disclosed in Japanese Patent Application Laid-Open. No. 5-24877 is used to form a drawing end by automatically welding a dummy rod held by a lower chuck to the bottom end of an optical fiber base material held by an upper chuck of the apparatus to be hung in the air, heating the portion where the drawing end is formed with a burner, or a heating means, and slowly pulling down the lower chuck after a predetermined time has passed.

A burner is used as a heating means in the automatic drawing end forming apparatus disclosed in Japanese Patent Application Laid-Open No. 5-24877. For a large glass rod that has a diameter larger than 100 mm, forming of a conical shape using a burner is difficult. Accordingly, an electric furnace is generally used as a heating means. As an exemplary conical shape forming apparatus using an electric furnace for heating, a conical shape forming apparatus 100 is illustrated in FIG. 3. A glass rod 1 is hung by a hoisting device 4 via a connecting member 2 and a hanging shaft 3. A furnace 5 includes a heater 6, an insulating material 7, and a chamber 8. A carbon heater is generally used as a heater 6, because the heater is required to be capable of heating at a temperature of about 2000° C. to melt the glass rod 1. Since carbon oxidizes in the air at a temperature of 500° C. or higher, inactive gas atmosphere, for example, nitrogen gas atmosphere should be kept in the furnace 5. Accordingly, a top gas seal 9 and a bottom gas seal 10 are provided to the furnace 5 to prevent intrusion of atmospheric air. A receiving shaft 11 connected to the bottom portion of the glass rod 1, and the receiving shaft 11 is held by a receiving roller 12. A conical shape is formed in this configuration by rotating the receiving roller 12 to pull down the bottom portion of the heated glass rod 1.

A method of forming a conical shape using the conical shape forming apparatus 100 will be described using FIGS. 4A to 4C. FIGS. 4A to 4C selectively illustrate the bottom portion of the glass rod 1 and the heater 6 from the whole configuration of the conical shape forming apparatus 100 illustrated in FIG. 3. The glass rod. 1 includes an effective portion 14 and an ineffective portion 15 adjoining the effective portion 14. The end of the ineffective portion 15 is connected to the receiving shaft 11 so that the end can be pulled down by rotating the receiving roller 12. The glass rod 1 is set in the conical shape forming apparatus 100 with a boundary 13 between the effective portion 1 and the ineffective portion 15 positioned approximately at the middle height of the heater 6 (see FIG. 4A). Then heating by the heater 6 starts to raise the heating temperature to 2250° C. When the glass rod 1 softens, the receiving roller 12 is rotated to pull down the bottom end of the class rod 1 (the end of the ineffective portion 15) (see FIG. 4B). In this process, the boundary 13 moves downward to the bottom portion of the heater 6, reducing its diameter, and thereby a conical section 16 having a conical shape is formed in the effective portion 14 with the boundary 13 with the boundary 13 having a reduced diameter located at the tip of the conical shape (see FIG. 4C). The section in the ineffective portion 15 side of the boundary 13 is removed by thermal cutting.

In this example, the bottom end of the glass rod is pulled down by the receiving roller. Alternatively, the bottom end can be held by a chuck and pulled down together with the chuck. In the example, the conical section is formed by heating the bottom portion of the glass rod and pulling down the bottom end. Alternatively, since the glass rod actually has ineffective portions on both ends of the effective portion, the top portion of the glass rod may be heated to pull up the top end.

SUMMARY OF THE INVENTION

Problems to be Solved by the Invention

When clean quartz glass is heated at a temperature from about 1400° C. to about 1700° C. for a long period of time, crystallization occurs from the surface with time. This phenomenon is generally called devitrification. When the surface is contaminated with, for example, alkali metals, the low Limit temperature at which crystallization occurs decreases to about 1200° C. and the crystal growth rate increases, although the degree of the increase depends on the level of contamination. That is, three factors, i.e., temperature, time, and contamination, have an effect on crystal growth. Above the high limit of the temperature range in which the crystal grows (hereinafter referred to as "crystallization temperature range") (approximately 1700° C.), the generated crystal melts back to glass. Since the surface temperature of glass during the forming of a conical shape reaches 1900° C. or above, the glass when heated from the room temperature inevitably passes through the crystallization temperature range.

Crystallization in a heated glass rod starts from the surface. When heated with a burner, although crystals are generated on the surface by the temperature reaching the crystallization temperature range, relatively large amount of glass on the surface volatilizes by the flame flow, so that almost no crystal remains on the surface of the final product.

In contrast, when heated with a heater, only a slight amount of glass on the surface is volatilized after generation of crystals. The effect of reducing crystals can only be obtained by transformation of a crystal to glass which takes place under heating at a temperature above the high limit of the crystallization temperature range. For this reason, a larger amount of crystals remains on the surface than when heated by a burner.

When a large amount of crystals remains on the surface of an optical fiber base material, crystals remain on the surface of the fiber after heated in the drawing process. Since a crystal cannot deform freely like glass, a flaw is generated on the surface of an optical fiber formed by drawing, which may easily cause a break when the fiber is tensioned. The amount of remaining crystals depends on the contamination on the surface. For example, it has been observed that in some cases, a crystal as large as can visually be seen remains on the upper portion of the conical section 16.

An object of the present invention is to provide a method of forming a conical shape on a glass rod that can suppress crystallization on the surface of a glass rod even when heating of the glass rod to form a conical shape on the glass rod is performed by an electric heater, and a glass rod.

Means for Solving the Problems

According to an embodiment of the present invention, in a method of forming a conical shape on a glass rod including an effective portion and an ineffective portion adjoining the effective portion, a conical shape being formed in the effective portion by simultaneously heating a boundary and a vicinity of the boundary between the effective portion and the ineffective portion and pulling an end of the ineffective portion, the method includes: simultaneously raising temperature of the heater and moving a heating target on the glass rod from the ineffective portion side to the boundary. For example, heating starts in an ineffective portion, and then a heating target is gradually moved toward a boundary. By moving the heating target, the time in which temperatures of the boundary and the vicinity of the boundary between an effective portion and the ineffective portion are kept within the crystallization temperature range can surely be reduced. This reduces the generation rate of crystals on the surface of the optical fiber base material on which a conical shape is formed.

Forming of a conical shape is performed under a high heating temperature of about 2000° C. It takes time to raise the temperature because the temperature increase rate of a heater is typically about 40 to 60° C./min. Therefore, after starting the heating of the ineffective portion with the heater, it is preferable to start moving the heating target when the heating temperature of the heater reaches a predetermined temperature (e.g., 1500° C.)

Preferably, the heating temperature of the heater is 1700° C. or above at the time when the heating target has come to the boundary between the effective portion and the ineffective portion. By setting the heating temperature of the boundary to the high limit of the crystallization temperature range of 1700° C. or above, generation of crystals can effectively be suppressed because the rising temperature on the surface of the glass passes through the crystallization temperature range within a short period of time and no crystal is generated at about 1700° C. or above. Basically, when the heating target comes to the boundary between the effective portion and the ineffective portion, the surface temperature of the heated glass is preferably at the high limit of the crystallization temperature range of 1700° C. or above. However, in the embodiment of the present invention, the heating temperature of the heater is set to 1700° C. or above to achieve the effect described above, because the measurement of the surface temperature of the glass is difficult but the difference between the heating temperature of the heater and the surface temperature of the heated glass is very small.

The glass rod according to an embodiment of the present invention is a glass rod having a conical shape formed by the method of forming a conical shape on a glass rod according to an embodiment of the present invention.

DETAILED DESCRIPTION OF THE EMBODIMENTS

A method of forming a conical shape on a glass rod according to an embodiment of the present invention will be described using FIGS. 1A to 1E. One of the differences between the method according to the embodiment of the present invention and a conventional method is that the relative positional relationship between a glass rod and a heater is fixed in the conventional method whereas in the method according to the embodiment of the present invention, the relative positional relationship between a glass rod and a heater changes along the central axis of the glass rod since a heating target heated by the heater have to be moved. There is no other difference that affects the configuration of the apparatus. Therefore, the conical shape forming apparatus according to the embodiment of the present invention can be provided by adding a function of changing the relative positional relationship between a glass rod and a heater along the central axis of the glass rod to a conventional conical shape forming apparatus 100 illustrated in FIG. 3. Since the change in the positional relationship is a relative change, it may be configured to move the glass rod with the heater fixed or to move the heater with the glass rod fixed. The conical shape forming apparatus 100 illustrated in FIG. 3 configured to move the glass rod 1 along the central axis will exemplarily be described below.

Figures 1A, 1B, 1C:
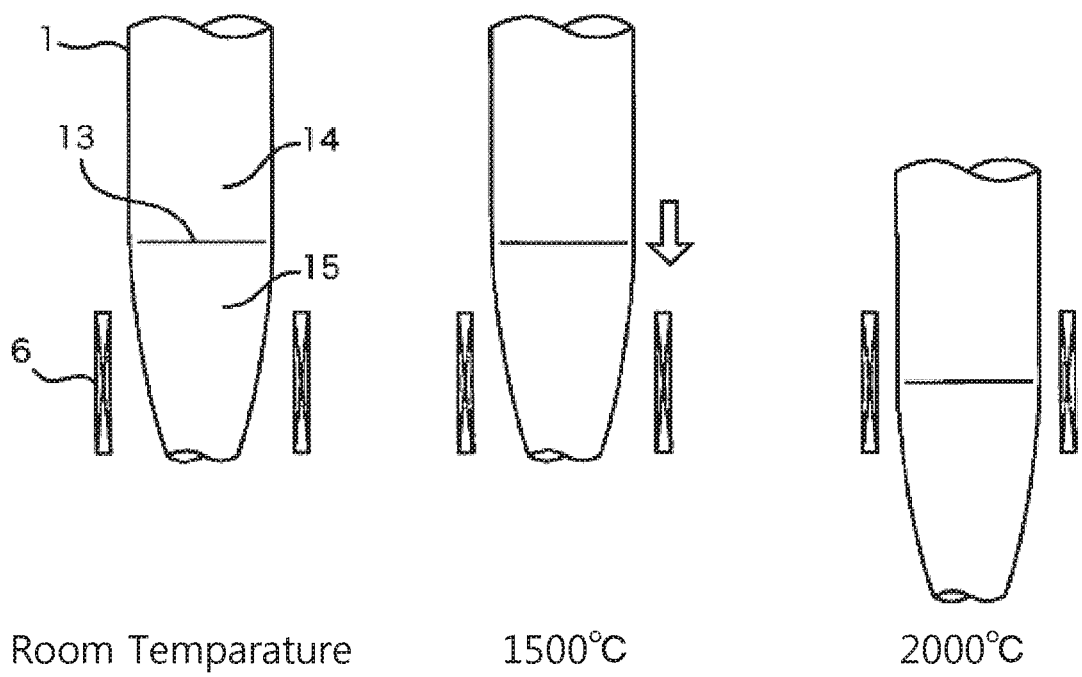
FIGS. 1A to 1E are figures explaining a method of forming a conical shape on a glass rod according to an embodiment of the present invention.
Figure 3:
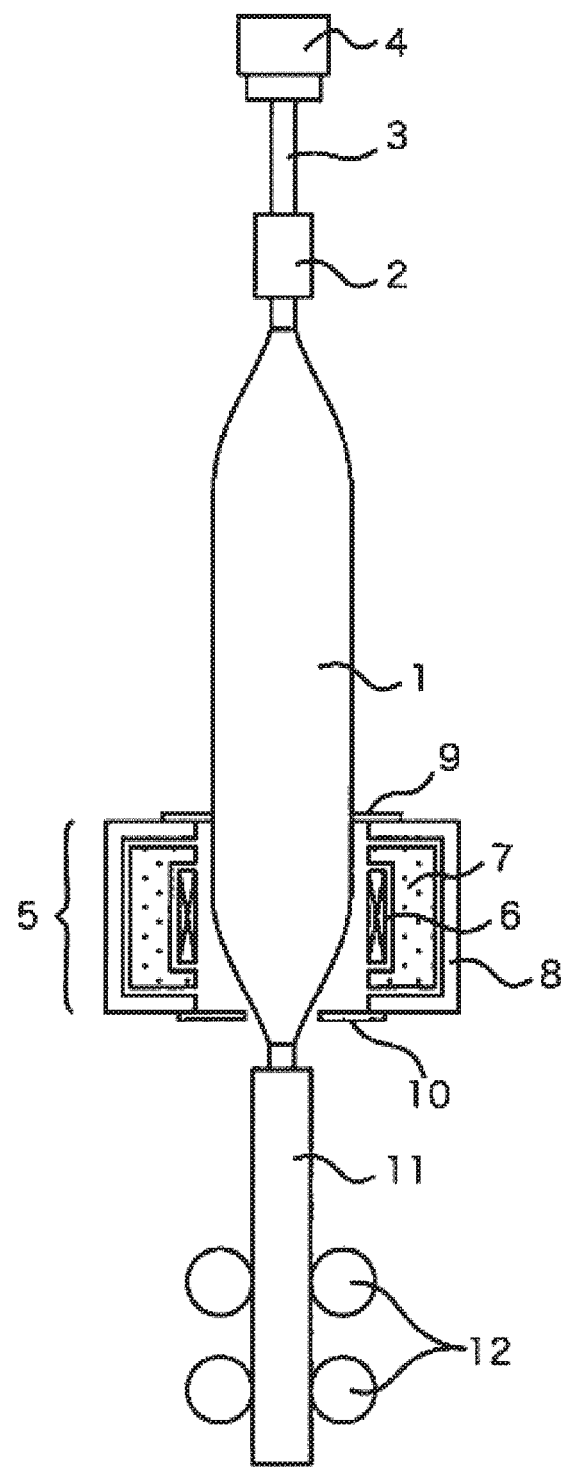
FIG. 3 illustrates an exemplary configuration of a conical shape forming apparatus.
Figures 4A, 4B, 4C:
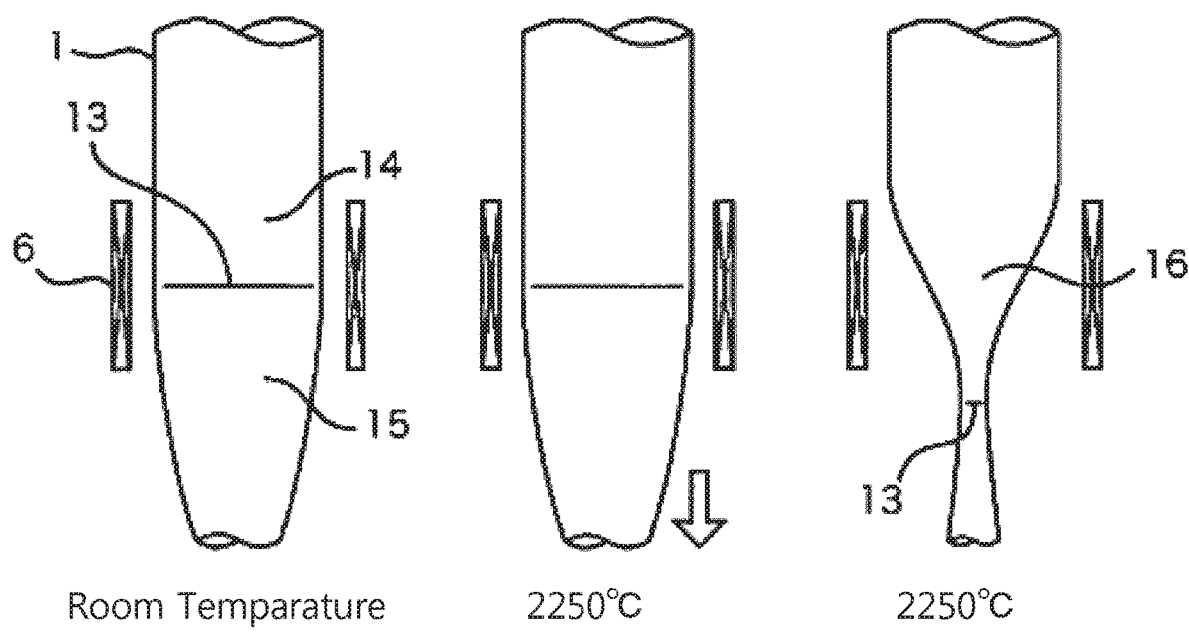
FIGS. 4A to 4C are figures explaining a conventional method of forming a conical shape on a glass rod.

FIGS. 1A to 1E selectively illustrate the bottom portion of the glass rod 1 and a heater 6 from the whole configuration of the conical shape forming apparatus 100 illustrated in FIG. 3. The glass rod 1 has an effective portion 14 and an ineffective portion 15 adjoining the effective portion 14. The end of the ineffective portion 15 is connected to a receiving shaft 11. By rotating a receiving roller 12, the glass rod 1 can be pulled down to move the heating target of the heater 6. As illustrated in FIG. 1A, the glass rod 1 is set in the conical shape forming apparatus 100 with the ineffective portion 15 positioned partially inside the heater 6 and a boundary 13 positioned outside the heater 6 so that the effective portion 14 is positioned far from the heater 6. Heating by the heater 6 to raise the temperature starts in this state. At the start of the heating to raise the temperature, the downward movement of the glass rod 1 to move the heating target may start. However, since the temperature increase rate of the heater is typically about 40 to 60° C./min, it is difficult to rapidly raise the temperature of the heater 6 to the heating temperature required for forming a conical shape (about 2000° C.) before the boundary 13 comes to the heater 6. Accordingly, the apparatus may be configured that the glass rod 1 does not move downward before the temperature reaches a predetermined temperature (e.g., 1500° C.) and that the downward movement of the glass rod 1 starts after the temperature reaches the predetermined temperature and the temperature continues to rise along with the downward movement of the glass rod 1 (see FIG. 1B). The downward movement of the glass rod 1 stops when the boundary 13 comes to an approximately middle height of the heater 6. Preferably, the heating temperature of the heater 6 at this state is 1700° C. or above (e.g., 2000° C.) (see FIG. 1C). By setting the heating temperature of the boundary 13 to the high Limit of the crystallization temperature range of 1700° C. or above, generation of crystals can effectively be suppressed because the rising temperature on the surface of the glass passes through the crystallization temperature range within a short period of time and no crystal is generated at about 1700° C. or above. Basically, when the heating target comes to the boundary between the effective portion 14 and the ineffective portion 15, the surface temperature of the heated glass is preferably at the high limit of the crystallization temperature range of 1700° C. or above. However, in the embodiment of the present invention, the heating temperature of the heater 6 is set to 1700° C. or above to achieve the effect described above, because the measurement of the surface temperature of the glass is difficult hut the difference between the heating temperature of the heater 6 and the surface temperature of the heated glass is very small.

Figures 1D, 1E:
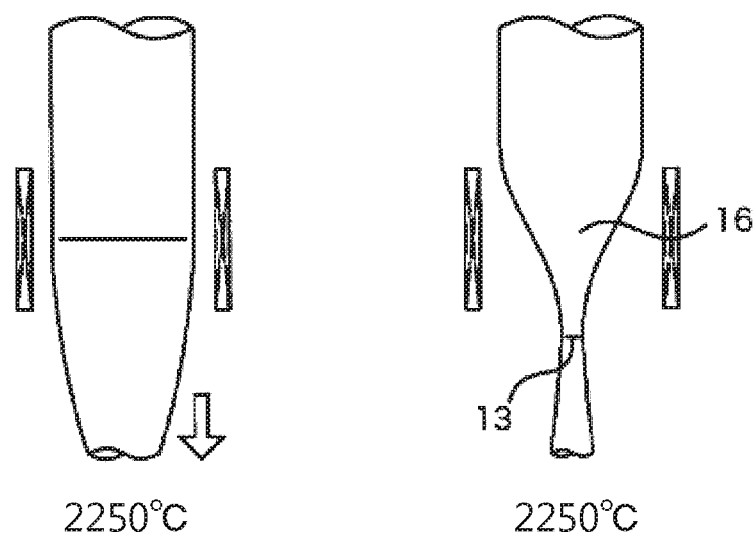
Figure 2:
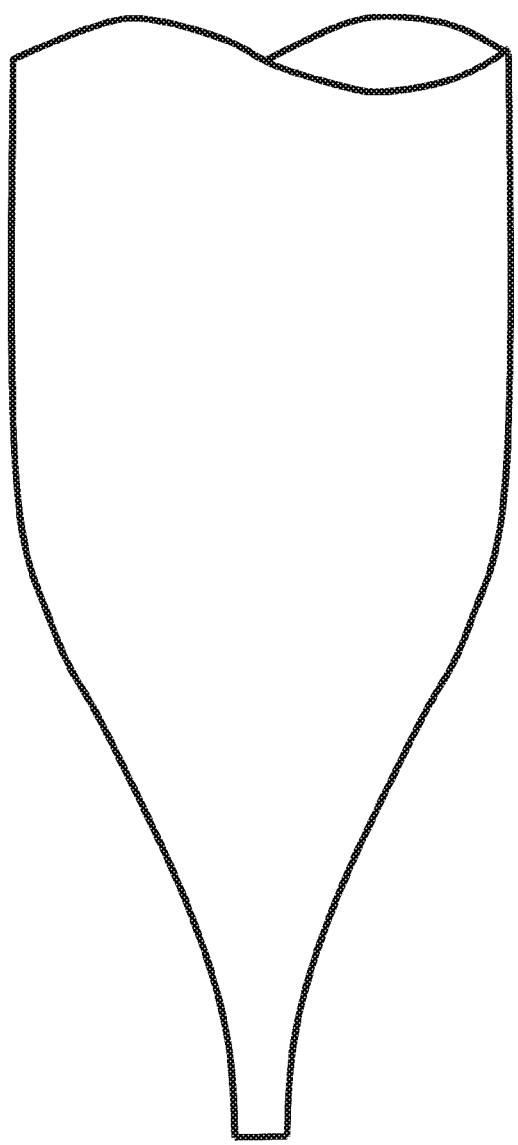
FIG. 2 illustrates a conical shape.

With the continuing rise of the temperature, when the temperature reaches the temperature for forming a conical shape (e.g., 2250° C.), the receiving roller 12 is rotated to pull down the bottom end of the glass rod 1 (the end of the ineffective portion 15) (see FIG. 1D). By pulling down the bottom end of the glass rod 1 by a predetermined distance, the boundary 13 moves to the bottom portion of the heater 6 reducing its diameter, and thereby a conical section 16 having a conical shape is formed in the effective portion 14 side of the boundary 13, as illustrated in FIG. 1E. The portion in the ineffective portion 15 side of the boundary 13 is removed by thermal cutting.

By simultaneously raising the temperature of the heater and moving the heating target on the glass rod from the ineffective portion side to the boundary as described above, the time in which temperatures of the boundary between the effective portion and the ineffective portion and the upper portion of the boundary are kept within the crystallization temperature range can surely be reduced. This reduces the generation rate of crystals on the surface of the optical fiber base material on which a conical shape is formed.

EXAMPLE

A conical shape was formed on a glass rod 1 having the maximum diameter of 190 to 200 mm using an apparatus provided by customizing a conical shape forming apparatus 100 illustrated in FIG. 3 to move a glass rod 1 along the direction of the central axis. A carbon heater having the inner diameter of 250 mm and the height of 210 mm was used as a heater 6. The glass rod 1 was set so as an ineffective portion 15 to be positioned partially inside the heater 6 and a boundary 13 to be positioned 200 mm above the middle height of the heater 6, that is, the boundary 13 to be positioned 95 mm above outside the top of the heater 6. Then heating was performed by the heater 6 to raise the temperature to 1500° C. at the temperature increase rate of 60° C./min. After the temperature reached 1500° C., the glass rod 1 was moved downward at the rate of 20 mm/min with the heating continuing at the temperature increase rate of 50° C./min to raise the temperature to 2000° C. After ten minutes when the boundary 13 has moved 200 mm downward to come to an approximately middle height of the heater 6 as illustrated in FIG. 1C, the downward movement of the glass rod 1 was stopped. Heating was continued at the temperature increase rate of 40° C./min, and when the temperature reached 2250° C., the temperature was kept, and the bottom end of the glass rod 1 was pulled down to form a conical section 16 while maintaining the temperature and heating the boundary 13. At this state, the boundary 13 had come near the bottom end of the heater 6. Then the power of the heater 6 was turned off, and while the temperature was falling, the bottom end of the glass rod 1 was slowly pulled down to prevent bending deformation of the conical section 16. By the method described above, a conical shape was formed on each of 100 glass rods and none of the glass rods showed growth of crystals.

COMPARATIVE EXAMPLE

By using a conventional conical shape forming apparatus 100 illustrated in FIG. 3, a conical shape was formed on a glass rod having the maximum diameter of 190 to 200 mm. A carbon heater having the inner diameter of 250 mm and the height of 210 mm was used as a heater 6. A glass rod 1 was set so as a boundary 13 to be positioned approximately at the middle height of the heater 6 and heated by the heater 6 at the temperature increase rate of 60° C./min up to 1500° C. After the temperature reached 1500° C., heating was continued at the temperature increase rate of 50° C./min to raise the temperature to 2000° C. Heating was further continued at the temperature increase rate of 40° C./min. When the temperature reached 2250° C., the temperature was kept and the bottom end of the glass rod 1 was pulled down to form the conical section 16. At this state, the boundary 13 had come near the bottom end of the heater 6. Then the power of the heater 6 was turned off, and while the temperature was falling, the bottom end of the glass rod 1 was slowly pulled down to prevent bending deformation of the conical section 16. By the method described above, a conical shape was formed on each of 100 glass rods and 12 glass rods showed growth of crystals on the surface of the conical section 16.

What is claimed is:

1. A method of forming a conical shape on a glass rod including an effective portion and an ineffective portion adjoining the effective portion at a boundary, the method comprising:
   providing a heater, and
   simultaneously raising the temperature of the heater and moving the glass rod so that the boundary between the effective portion and the ineffective portion is positioned inside the heater;
   stopping the movement of the glass rod when the boundary between the effective portion and the ineffective portion comes to a middle height of the heater;
   raising the temperature of the heater to a forming temperature for forming a conical shape while the movement of the glass rod is stopped;
   pulling an end of the ineffective portion and forming the conical shape while maintaining the temperature of the heater at the forming temperature for forming a conical shape and heating the boundary between the effective portion and the ineffective portion; and removing the ineffective portion from the effective portion by thermal cutting at the boundary.

2. The method of forming a conical shape on a glass rod according to claim 1, wherein the simultaneous raising of the temperature of the heater and moving of the glass rod start from a position in which the ineffective portion is positioned inside the heater.

3. The method of forming a conical shape on a glass rod according to claim 1, wherein the moving starts after the temperature of the heater has been raised to a heating temperature lower than the forming temperature for forming a conical shape.

4. The method of forming a conical shape on a glass rod according to claim 1, wherein the heating temperature of the heater is 1700° C. or above when the boundary has moved inside the heater.

* * * * *